United States Patent
Lahey et al.

(10) Patent No.: US 10,198,228 B2
(45) Date of Patent: Feb. 5, 2019

(54) DISTRIBUTED DATA TABLES FOR PRINT JOBS IN A PRINT WORKFLOW SYSTEM

(71) Applicants: Leonard Corning Lahey, Boulder, CA (US); Adam Swartz, Boulder, CO (US); Brent James Winters, Longmont, CO (US)

(72) Inventors: Leonard Corning Lahey, Boulder, CA (US); Adam Swartz, Boulder, CO (US); Brent James Winters, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 39 days.

(21) Appl. No.: 15/060,232

(22) Filed: Mar. 3, 2016

(65) Prior Publication Data
US 2017/0255430 A1 Sep. 7, 2017

(51) Int. Cl.
*G06F 3/12* (2006.01)

(52) U.S. Cl.
CPC .......... *G06F 3/1275* (2013.01); *G06F 3/1203* (2013.01); *G06F 3/127* (2013.01); *G06F 3/1208* (2013.01); *G06F 3/1243* (2013.01); *G06F 3/1262* (2013.01); *G06F 3/1282* (2013.01); *G06F 3/1273* (2013.01)

(58) Field of Classification Search
None
See application file for complete search history.

(56) References Cited

U.S. PATENT DOCUMENTS

| 5,168,444 | A | * | 12/1992 | Cukor ................. G06Q 10/083 705/30 |
|---|---|---|---|---|
| 7,380,163 | B2 | | 5/2008 | Davies et al. |
| 7,562,035 | B2 | | 7/2009 | Fellenstein et al. |
| 7,818,349 | B2 | | 10/2010 | Frost |
| 7,962,458 | B2 | | 6/2011 | Holenstein et al. |
| 8,051,094 | B2 | | 11/2011 | Agrawal et al. |
| 8,898,105 | B1 | | 11/2014 | Peddy et al. |
| 2005/0267917 | A1 | * | 12/2005 | Arcuri ............... G06F 17/30864 |
| 2009/0033978 | A1 | | 2/2009 | Morales |

(Continued)

FOREIGN PATENT DOCUMENTS

| CA | 2618938 A1 | 7/2009 |
|---|---|---|
| WO | 0125906 A1 | 4/2001 |

OTHER PUBLICATIONS

European Search Report; Appl 171576416; dated Aug. 3, 2017.

*Primary Examiner* — Lennin R Rodriguezgonzalez
(74) *Attorney, Agent, or Firm* — Duft & Bornsen, PC

(57) ABSTRACT

Systems and methods are provided for managing a print job archive. The system includes a plurality of databases that store print job properties, wherein at least one database is designated to record the print job properties as a function of a predetermined characteristic of the print job. The system also includes an interface that receives multiple print jobs, and a data distribution module coupled with the plurality of databases and the interface. For each of the multiple print jobs, the data distribution module categorizes the print job based on at least one predetermined characteristic, identifies a database among the plurality of databases that is designated for the print jobs as a function of the at least one predetermined characteristic, and stores the print jobs in the identified database as a function of the at least one predetermined characteristic.

20 Claims, 6 Drawing Sheets

(56) References Cited

U.S. PATENT DOCUMENTS

| | | | |
|---|---|---|---|
| 2009/0276466 A1* | 11/2009 | Blohm | G06Q 30/02 |
| 2012/0212775 A1* | 8/2012 | Jahn | G06F 3/1205 |
| | | | 358/1.15 |
| 2014/0019421 A1 | 1/2014 | Jagadeesan | |
| 2015/0134695 A1* | 5/2015 | Zhao | G06F 17/30587 |
| | | | 707/769 |
| 2015/0237220 A1* | 8/2015 | Seetharam | H04N 1/001 |
| | | | 358/1.15 |

* cited by examiner

FIG. 3

JOB TABLE

|  | JOB_ID | JOB_TYPE | # OF DOCS | # OF PAGES | JOB NAME |
|---|---|---|---|---|---|
| RECORD → | 14524 | CHECKS | 3089 | 3089 | MVS_JOBNAME1 |
| RECORD → | 14525 | HOME LOANS | 521 | 2723 | MVS_JOBNAME2 |
| RECORD → | 14526 | CC STATEMENTS | 10935 | 15821 | MVS_JOBNAME3 |
| RECORD → | 14527 | CHECKS | 8128 | 8128 | MVS_JOBNAME4 |

310

DOCUMENT TABLE

|  | JOB_ID | DOC-ID | OFFSET | CUSTOMER NAME | ADDRESS | INSERTION |
|---|---|---|---|---|---|---|
| RECORD → | 14524 | 258799 | 361 | ELENA CASS | 1480 ELM RD | FILE3 |
| RECORD → | 14525 | 437567 | 01 | KIP LANSFORD | 1260 YARD ST | N/A |
| RECORD → | 14526 | 743677 | 757 | ARTHUR ROMILLY | 124 FIRST ST | FILE1 |
| RECORD → | 14527 | 821165 | 21 | DARIUS LUNDGREN | 16 MANOR DRV | FILE3 |

320

DISTRIBUTED DATA TABLES FOR PRINT JOBS IN A PRINT WORKFLOW SYSTEM

FIELD OF THE INVENTION

The invention relates to the field of printing, and in particular, to printing documents for mass-mailing.

BACKGROUND

Mail production systems generally include high-speed printers used for volume printing, and may be capable of printing hundreds of pages of content per minute or more. A typical mail production system includes multiple continuous-form printing systems that mark paper or other printable media. When mail pieces are produced in high volume (e.g., when the mail pieces are account statements from a large bank or credit provider), it may be necessary to print batches of hundreds of thousands, if not millions of mail pieces on a regular basis. To handle such print batches, the batch may be split into print jobs, and each print job sent to one of multiple printing systems.

A print shop is often managed by a print server that distributes print jobs and records properties of the print jobs as the documents are prepared for delivery (e.g., when they were printed, who they were directed to, the address they were mailed to, etc.). Archiving the information for a large volume of documents (e.g., millions or tens of millions of documents) across numerous different print jobs remains problematic, because archiving such information in a single database results in the database becoming large, inefficient, and difficult to manage and replicate for backup purposes. For example, in addition to requiring large amounts of system memory and processing resources, a database with a large table of document properties increases the rate of contention issues and failed/hung queries which results in transaction delays, and also requires long delays for outages to restore the table with a backup. Therefore a need remains for mail production database solutions with enhanced archiving functionality.

SUMMARY

Embodiments described herein implement multiple active database instances for archiving print job information. Specifically, recording of job/document values for print jobs may be divided among multiple databases. Each database stores values for print jobs which are homogenous (e.g., documents of the print jobs may be printed together, inserted together, etc.). Accesses to job/document values during processing of a print job may therefore be directed substantially to a single, smaller database for increased efficiency and improved backup capabilities.

One system includes a plurality of databases that store print job properties, wherein at least one database is designated to record the print job properties as a function of a predetermined characteristic of the print job. The system also includes an interface that receives multiple print jobs, and a data distribution module coupled with the plurality of databases and the interface. For each of the multiple print jobs, the data distribution module categorizes the print job based on at least one predetermined characteristic, identifies a database among the plurality of databases that is designated for the print jobs as a function of the at least one predetermined characteristic, and stores the print jobs in the identified database as a function of the at least one predetermined characteristic.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 3 is a diagram illustrating job tables and document tables in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
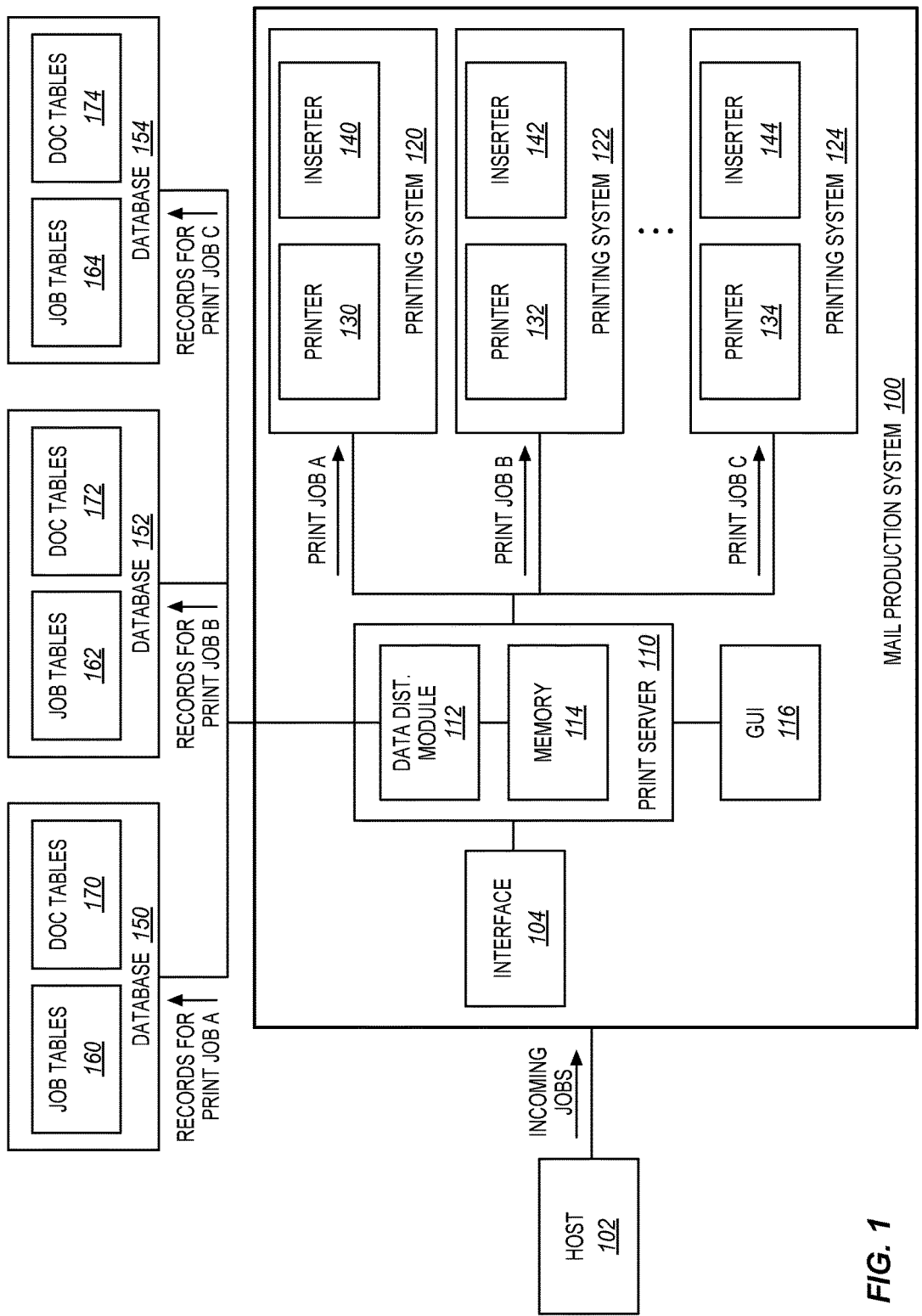
FIG. 1 is a block diagram of a mail production system in an exemplary embodiment.

FIG. 1 is a block diagram of a mail production system 100 in an exemplary embodiment. Mail production system 100 comprises any system, device, or component operable to turn incoming print data into physically deliverable packages for mailing. As referred to herein, a mail piece may comprise a portion of print data intended for printing onto physical media and eventual transport to a specified delivery address. For example, a mail piece may be printed onto a sheet of paper and placed inside of an envelope, whereupon the envelope is later stamped, addressed, and shipped to the intended delivery location.

Mail production system 100 may comprise interface 104, print server 110, graphical user interface (GUI) 116, and printing systems 120/122/124. Interface 104 (e.g., an Ethernet interface, wireless interface, a bus, etc.) may receive print jobs from one or more hosts 102 over a communication medium. Host 102 may be a server or software application used by print shop customers to submit print data and job tickets to the print server 110. Print server 110 may schedule the print jobs and manages the workflow process of printing systems 120/122/124. GUI 116 may enable a user or administrator of print server 110 to manipulate workflows and input/view print job processing values and settings.

Printing systems 120/122/124 may comprise any combination of production printers (e.g., high volume continuous-forms printers) and associated post-print machinery (e.g., inserters, staplers, hole punchers, etc.). Each of printing systems 120/122/124 may have a different set of processing capabilities than its peers that is not shared universally across all of printing systems 120/122/124. For example, printing system 120, which includes printer 130 and inserter 140, may have a different set of inserts available than that of printing system 122 (which includes printer 132 and inserter 142) or printing system 124 (which includes printer 134 and inserter 144). As another example, the ink or media available at printing system 122 may be different than that available at printing system 120 or printing system 124. Each printing system 120/122/124 may include other devices and components that perform activities for a print shop not shown in FIG. 1, such as other types of post-printing machinery, e-mail or web publishing servers, etc.

Print server 110 may include a data distribution module 112 and memory 114 to dynamically queue and manage print jobs sent to one of the candidate printing systems 120/122/124 of a print shop. Data distribution module 112 may be operable to couple directly or indirectly with multiple active databases 150/152/154 for enhanced storing of print job data. Specifically, data distribution module 112 may be capable of dividing the collective archive of information across numerous print jobs into separate table files (e.g., job tables 160/162/164 and document tables 152/154/156) partitioned across multiple databases 150/152/154. To accomplish this, data distribution module 112 may be operable to separate print jobs into types (e.g., type A, B, C) that can be processed by a particular printing system 120/122/124. As the print jobs process in respective printing systems 120/122/124, data distribution module 112 may perform read and write operations to the tables of a database which is designated for a particular type of print job (e.g., type A, B, C). Print server 110 may therefore process a print job through a print workflow with a smaller, more manageable database with minimum retrieval from other databases during processing a print job through a print workflow.

Data distribution module 112 advantageously reduces the size of archived job/document values by a factor of the number of separate databases 150/152/154 generated/managed by data distribution module 112 of print server 110. This provides a benefit in efficiency and backup/recovery operations over previous systems which implement one centralized database for archiving print jobs that necessitate significant resources in processing and time to index and access job/document values during the course of processing a print job. Data distribution module 112 may be implemented as custom circuitry, as a processor executing programmed instructions, etc. In one embodiment, data distribution module 112 is implemented on different hardware than print server 110.

Figure 2:
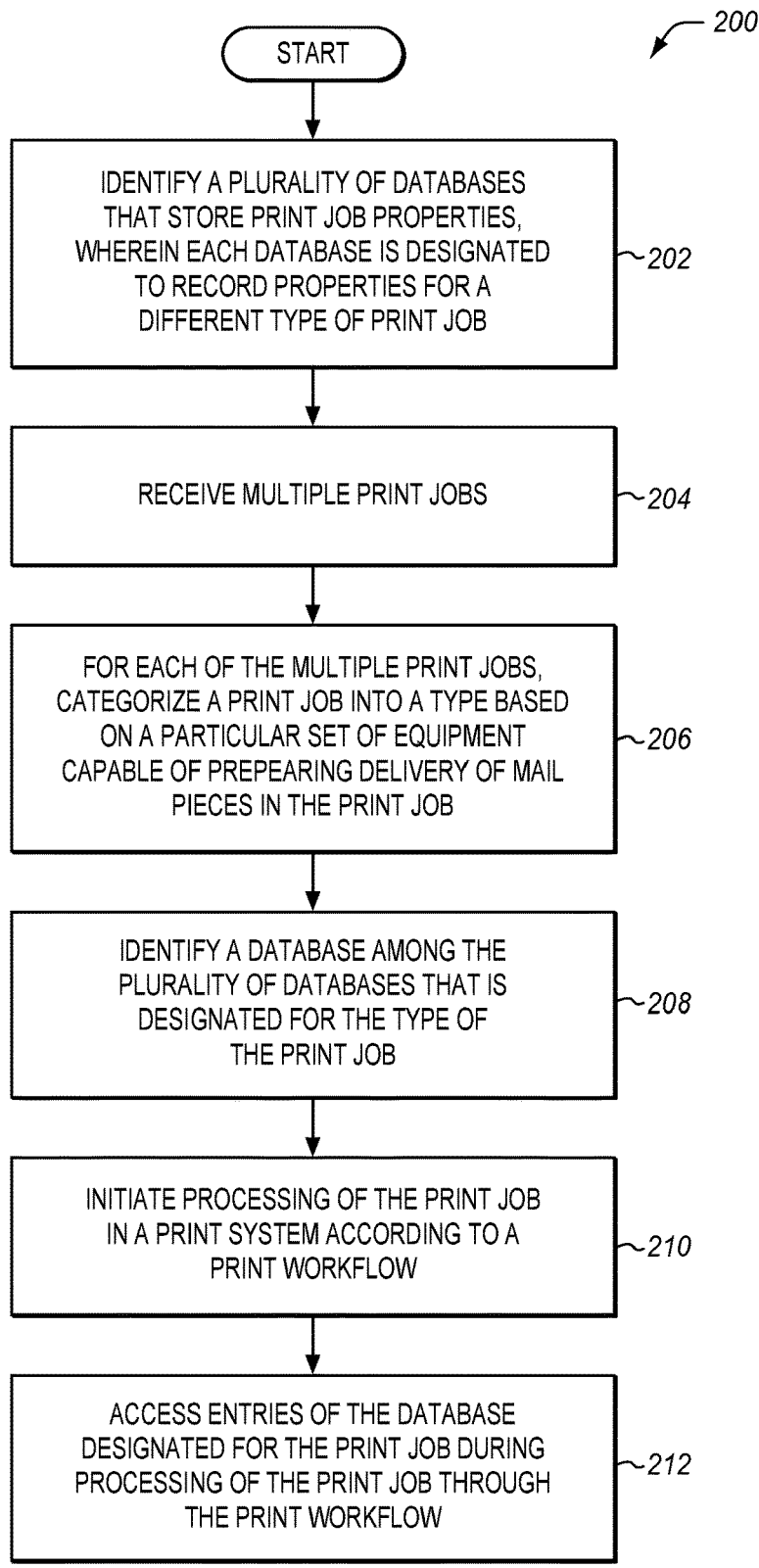
FIG. 2 is a flowchart illustrating a method for operating a mail production system in an exemplary embodiment.

The particular arrangement, number, and configuration of components described herein is exemplary and non-limiting. Illustrative details of the operation of mail production system 100 will be discussed with regard to FIG. 2. FIG. 2 is a flowchart illustrating a method 200 for operating mail production system 100 in an exemplary embodiment. The steps of method 200 are described with reference to mail production system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, data distribution module 112 identifies a plurality of databases 150/152/154 that store print job properties, wherein each database is designated to record properties for a different type of print job. In general, databases 150/152/154 may distribute document-level tables (e.g., document tables 170/172/174) and job-level tables (e.g., job tables 160/162/164) across discrete computational resources. Databases 150/152/154 may be implemented in multiple computers located in the same physical location (e.g., mail production system 100) or may be dispersed over a network of interconnected computers (e.g., implemented as network servers connected to print server 110 over the Internet, company intranet, etc.).

Data distribution module 112 may determine which one of the separate, autonomous databases 150/152/154 receives an incoming job. Tables (e.g., job tables 160/162/164 and document tables 170/172/174) in different databases may store the same types of properties and/or store records in the same format even though the values of the records are different in each database since each database may be designated for different types of print jobs. A table may comprise a delimited file (e.g., a comma separated value, tab delimited value, etc.) for storing particular types of print job records. Each record may comprise a series of values for describing the print job or an internal document thereof.

FIG. 3 is a diagram illustrating a job table 310 and a document table 320 in an exemplary embodiment. Job table 310 includes records that describe job level information such as, but not limited to, a job identifier, a job type, number of documents contained in a job, number of pages in a job, job name, etc. Document table 320 includes records that describe document level information such as, but not limited to, a job identifier, a document identifier, an offset of the record in the job/print file, a customer name, a customer address, insertion information for the document, etc. As used herein, a "document" may be an independent portion of a print job that is directed to a specific recipient for delivery (e.g., a single piece of mail). Thus, multiple documents may be defined in a single file of print data for a print job.

Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself. The print data for the received print job may be formatted in a single file according to a Page Description Language (PDL), for example as an Advanced Function Presentation (AFP) datastream, as Portable Document Format (PDF) print data accompanied by Job Definition Format (JDF) job ticket instructions, or any other format known to those skilled in the art. Print server 110 may analyze the print job to identify each document, as well as to determine information indicating the recipient of each document (e.g., account number, recipient name, address, etc.).

Returning to FIG. 2, in step 204, interface 104 receives multiple print jobs. And, in step 206, data distribution module 112 categorizes, for each of the multiple print jobs, a print job into a type of print job based on a particular set of equipment capable of preparing delivery of mail pieces in the print job. Rules configured and stored in memory 114 may indicate preferences for which print jobs may be combined or commingled (e.g., processed with the same set of equipment or printing systems 120/122/124). Data distribution module 112 may detect print jobs received at interface 104 and determine the type of job based at least in part on its datastream format (e.g., PostScript, PCL, AFP, etc.), its filename extension (e.g., parse the JCL string for attributes to route the job, open the AFP file for TLEs (comment fields in the print datastream) which identify a job type, etc.), customer defined rules for categorizing print jobs stored in memory 114 (e.g., types of mail pieces detected in the job), or some combination thereof. Alternatively or additionally, print files received at interface 104 may be correlated with particular types of mail pieces in memory 114 which define different types of print jobs (e.g., Postscript data for checks, AFP data for mortgage statements, etc.). Data distribution module 112 may alternatively or additionally characterize print jobs using other criteria, such as a capability of the print job to print within a predetermined period of time (or within a scheduling gap between other print jobs), a material (e.g., ink or paper type) to be used for the print job, a material installed and/or matching at one of printing systems 120/122/124, a client/owner of the print job, or any other variety of rules or combinations of conditions for characterizing a print job.

In step 208, data distribution module 112 identifies a database among a plurality of databases 150/152/154 that is designated for the type of print job. In one embodiment, data distribution module 112 may monitor multiple input devices, such as hot folders, each of which may be correlated with a particular type of print job, type of mail piece, and/or particular database 150/152/154 in memory 114. Customers may therefore indicate a desired workflow and/or database to process a print job according to which hot folder of interface 104 receives the submitted files. For example, jobs received at one particular hot folder may be automatically sent to database 150 and jobs received at another hot folder may be automatically sent to database 152. As used herein, a hot folder may comprise a file archive that sweeps files automatically into a specified task periodically or according to user-defined thresholds (e.g., number of files received, particular files received, etc.).

In step 210, data distribution module 112 initiates processing of the print job in one of printing systems 120/122/124 according to a print workflow. And, in step 212, data distribution module 112 accesses entries of the database designated for the print job during processing of the print job through the print workflow. That is, after the print job has been received/detected, data distribution module 112 may select a print workflow for the print job and direct the devices of the assigned printing system 120/122/124 according the user configured steps of the print workflow.

Figure 4:
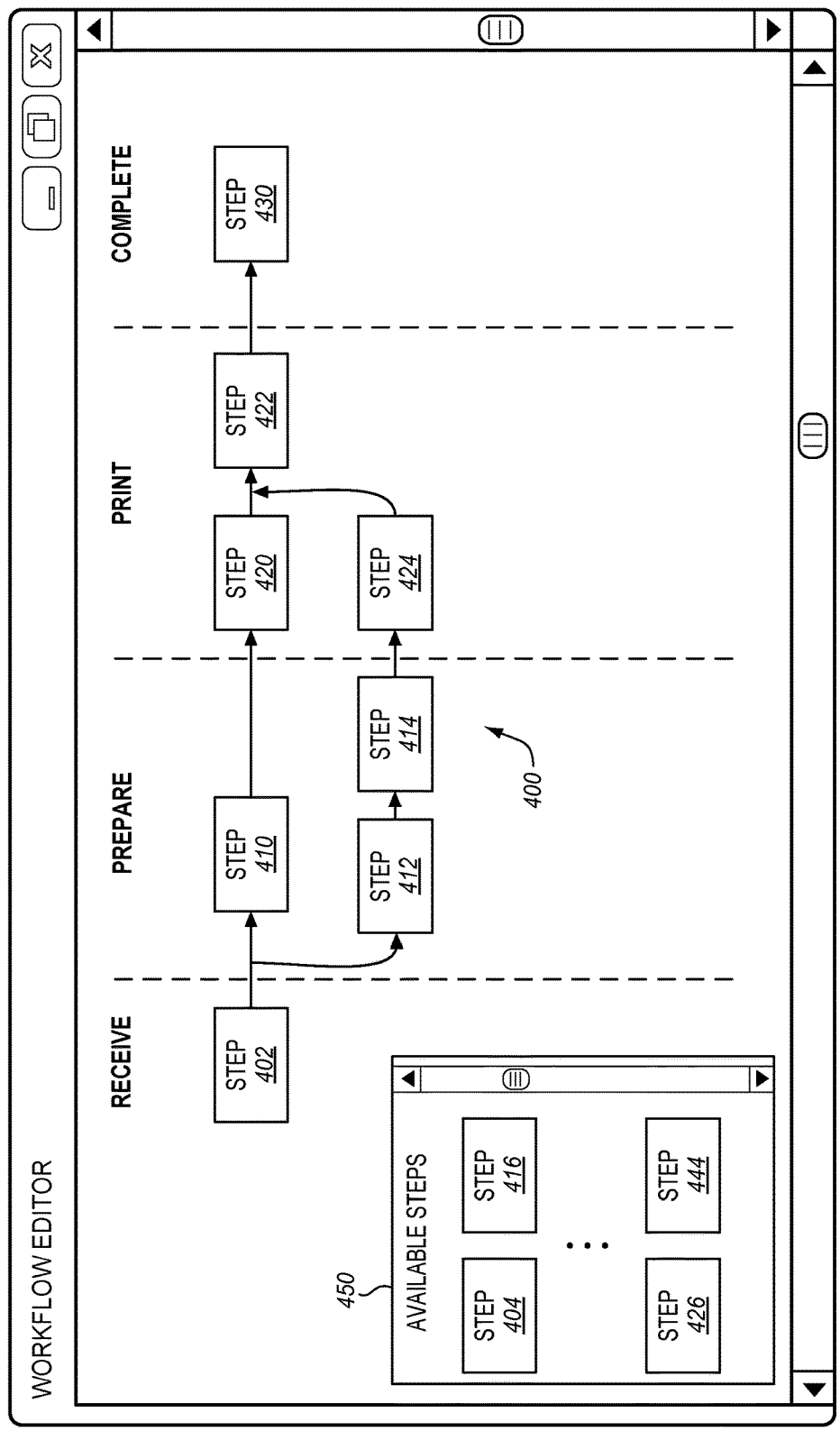
FIG. 4 is a block diagram illustrating a graphical user interface for generating and editing a print workflow in an exemplary embodiment

FIG. 4 is a block diagram illustrating a graphical user interface (e.g., GUI 116 of print server 110) for generating and editing a print workflow 400 in an exemplary embodiment. A user may drag-and-drop available steps 450 (e.g., activities of print system 130) into phases (e.g., Receive, Prepare, Print, Complete) and make logical connections between the steps to form a print workflow 400. Other techniques for programming the workflow 400 that are known to those skilled in the art may also be used. Each phase may include a step or sequence of steps that perform a logical set of actions in printing systems 120/122/124. For example, the print workflow 400 may include configurable activities for directing a printer to print, or directing an inserter to insert documents into an envelope. As a step/activity is processed in this manner, in the designated database (e.g., one of databases 150/152/154) are accessed for print job properties.

Data distribution module 112 may identify the properties to track based on user input defining those properties, or may access parameters stored in internal memory 114 to determine which document properties to track. Data distribution module 112 may monitor the identified properties continuously, periodically, or in response to triggering events as desired. At least some of the information describing the print job may be indexed and/or stored in the table files of the designated print job in response to detection of the type of print job. Data distribution module 112 continues populating the archive based on newly detected print jobs in steps 206-212. These operations may be performed substantially continuously and in parallel as new print jobs are processed.

Referring back to FIG. 2, steps 206-212 may be continuously performed for each of the different types of print jobs as print jobs are handled by printing systems 120/122/124 of the print shop. Thus, instead of managing a large table of a particular set of properties in a single database, data distribution module 112 may distribute print job records between multiple tables that store that particular set of properties across separate databases 150/152/154, and each table may include a different portion of the collective archive of print jobs processed by print server 110. Print job data may thus be partitioned in a way that enables print server 110 to process print jobs substantially with a single, smaller database with minimal retrieval/accesses to other databases during processing of a print job. In other words, print data may be segregated into self-contained subsets which may be processed together (i.e., jobs that could be commingled or combined are stored in the same data partition).

It may be desirable for a user of print server 110 to view (e.g., via GUI 116 or a remote client) properties across multiple databases or tables (e.g., select a "Union All" view that shows the entirety of one type document table or shows all jobs in the system). In that regard, data distribution module 112 may insert a counter to job/document identifiers that is unique to each different database 150/152/154. For example, print jobs sent to database 150 are assigned a job identifier starting with 1 (i.e., 1 . . . ), print jobs sent to database 152 are assigned a job identifier starting with 2 (i.e., 2 . . . ). It will be appreciated that alternative formats for initializing identifiers may be implemented. Data distribution module 112 may similarly initialize counters differently for document identifiers according to the different database to which the documents are assigned. In response to a user request to view records across the databases 150/152/154, data distribution module 112 may retrieve records according to job/document identifiers based on the unique counter assigned to the requested information. Accordingly, data distribution module 112 may report a set of records to GUI 116 from multiple databases without presenting duplicates since all databases 150/152/154 may preface its counter with a different number. Alternatively or additionally, databases 150/152/154 may collectively prevent reporting duplicate job or document records by implementing a database column in the jobs table so that each job in the system may be uniquely identified.

Figure 5:
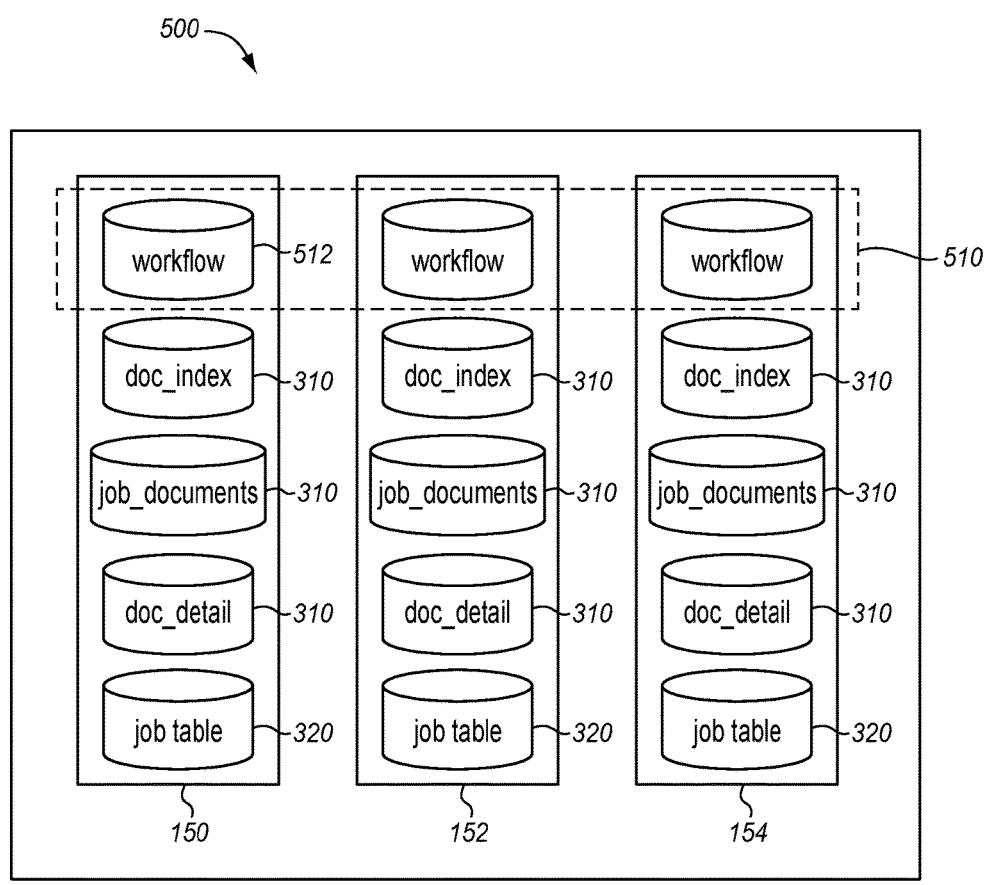
FIG. 5 is a block diagram of a print archive system in an exemplary embodiment.

FIG. 5 is a block diagram of a print archive system 500 in an exemplary embodiment. Databases 150/152/154 include document level tables 310 such as doc_index and doc_detail that contain information specific to each document in a job, and job_document that relates each document to a job. Databases 150/152/154 also include a job level table 320 (e.g., one row for each job). Additionally, one or more databases 150/152/154 may include non-partitioned tables 512, such as a table that defines print workflows. Information in non-partitioned tables 512 may be relatively static and may comprise information that does not necessitate frequent database accesses during print job processing.

In this example, one of the databases 150/152/154 maintains an instance of non-partitioned table 512 and implements a federated configuration 510 so that all databases may access the contents of non-partitioned table 512. Databases 150/152/154 may use federated nicknames for shared, non-partitioned tables. For example, if a common or unshared table is kept in database 150, a link/reference may be defined in database 152 to those tables so that information may be shared for accesses and updates. That is, a non-partitioned workflow table (or set of workflow tables, step tables, etc.) may reference information that is stored non-locally by tagging the defined properties within the table with a nickname that corresponds to the database (e.g., Steps (Nickname), Processes (Nickname), System Settings (NickName), etc.—for various properties defined for a print workflow stored in one local instance).

Alternatively or additionally, one of databases 150/152/154 may maintain document tables 310 and/or job tables 320 and report its content as needed by the other databases (e.g., read-only for non-owning databases). During processing of a print job, access operations may be performed for a database undesignated for that print job according to the nicknamed property. Databases 150/152/154 may also be configured to replicate document tables 310 and job tables 320 in separate synchronized instances. Thus, each database 150/152/154 may backup one or more table instances to other databases 150/152/154 or to dedicated standby machines and access the replica in response to a database (partition) failure or for database maintenance/upgrades. Each database 150/152/154 may failover its partitions (e.g., one at a time or all instances at once) to the replica partitions and then reintegrate the data and return the replica partition to a backup instance. Each database 150/152/154 is therefore autonomous with its own local copy of partitioned tables but able to access data from a different database as needed via nickname reference or a replicated copy. Since the intelligent partitioning of distribution module 112 described above reduces the size of archived job/document values by a factor of the number of separate databases 150/152/154, the downtime and processing for performing maintenance and backup operations is advantageously reduced.

Figure 6:
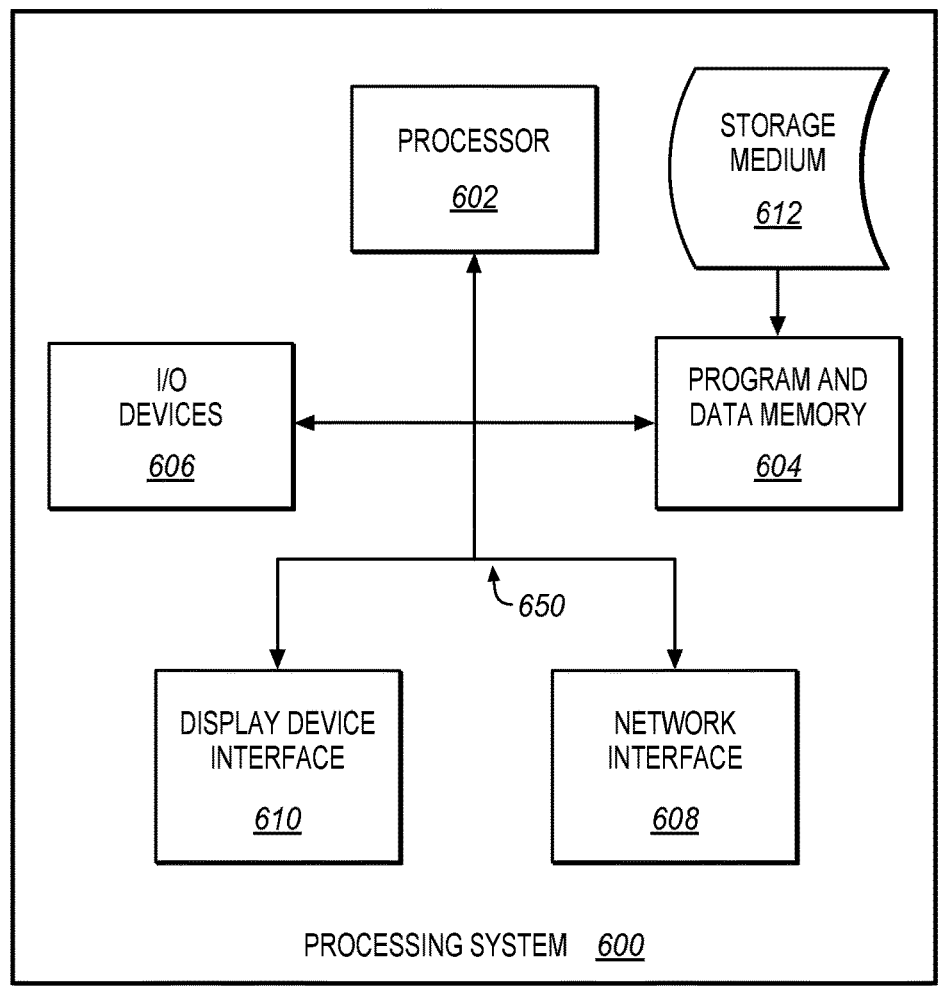
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 110, data distribution module 112, devices of printing systems 120/122/124, and/or databases 150/152/154 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

We claim:

1. A system comprising:
   a plurality of databases configured to store print job properties;
   an interface configured to receive multiple print jobs, wherein each print job includes a plurality of mail pieces to print and deliver to intended recipients; and
   a data distribution module coupled with the plurality of databases and the interface that, for each of the print jobs, is configured to select a database among the plurality of databases for storing properties of a print job based on a type of the print job, to initiate production of mail pieces of the print job in a print system according to a print workflow that defines a series of steps for producing the mail pieces, and to access entries of the database selected for the print job to retrieve the properties while the print job processes through the print workflow to prepare the mail pieces for printing and delivery.

2. The system of claim 1 wherein each database includes a document table with entries for recording properties of mail pieces, and wherein the document table for each database includes a common format for recording values across the plurality of databases.

3. The system of claim 1 wherein the print workflow includes a configurable set of steps that prepare the mail pieces of the print job for printing, and wherein each database includes a workflow table with entries that define processing parameters for the print workflow.

4. The system of claim 3 wherein the workflow table is configured to be shared among the databases.

5. The system of claim 1 wherein the data distribution module is configured to identify the type of the print job based on a hot folder that received the print job, and wherein the hot folder is one among a plurality of hot folders each associated with a different type of print job.

6. The system of claim 1 wherein the data distribution module is configured to assign a unique job identifier that distinguishes between jobs processed at different databases.

7. The system of claim 1 wherein the data distribution module is configured to identify the type of the print job based on a particular set of print shop equipment capable of preparing delivery of mail pieces in the print job.

8. A method comprising:
storing print job properties in a plurality of databases;
receiving multiple print jobs, wherein each print job includes a plurality of mail pieces to print and deliver to intended recipients; and
for each of the print jobs:
selecting a database among the plurality of databases for storing properties of a print job based on a type of the print job;
initiating production of mail pieces of the print job in a print system according to a print workflow that defines a series of steps for producing the mail pieces; and
accessing entries of the database selected for the print job to retrieve the properties while the print job processes through the print workflow to prepare the mail pieces for printing and delivery.

9. The method of claim 8 wherein each database includes a document table with entries for recording properties of mail pieces, the document table for each database has a common format for recording values across the plurality of databases.

10. The method of claim 8 wherein each database includes a workflow table with entries that define processing parameters for the print workflow.

11. The method of claim 10 wherein the workflow table is shared among the databases.

12. The method of claim 8 further comprising:
identifying the type of the print job based on a hot folder that received the print job, wherein the hot folder is one among a plurality of hot folders each associated with a different type of print job.

13. The method of claim 8 further comprising:
assigning a unique job identifier that distinguishes between jobs processed at different databases.

14. The method of claim 8 wherein:
the type of the print job is based on a particular set of print shop equipment capable of preparing delivery of mail pieces in the print job.

15. A non-transitory computer readable medium embodying programmed instructions which, when executed by a processor, are operable for performing a method comprising:
storing print job properties in a plurality of databases;
receiving multiple print jobs, wherein each print job includes a plurality of mail pieces to print and deliver to intended recipients; and
for each of the print jobs:
selecting a database among the plurality of databases for storing properties of a print job based on a type of the print job;
initiating production of mail pieces of the print job in a print system according to a print workflow that defines a series of steps for producing the mail pieces; and
accessing entries of the database selected for the print job to retrieve the properties while the print job processes through the print workflow to prepare the mail pieces for printing and delivery.

16. The medium of claim 15 wherein each database includes a document table with entries for recording properties of mail pieces, the document table for each database has a common format for recording values across the plurality of databases.

17. The medium of claim 15 wherein each database includes a workflow table with entries that define processing parameters for the print workflow.

18. The medium of claim 17 wherein the workflow table is shared among the databases.

19. The medium of claim 15 wherein the method further comprises:
assigning a unique job identifier that distinguishes between jobs processed at different databases.

20. The medium of claim 15 wherein the type of the print job is based on a particular set of print shop equipment capable of preparing delivery of mail pieces in the print job.

* * * * *